US010218818B2

(12) United States Patent
Lloyd et al.

(10) Patent No.: US 10,218,818 B2
(45) Date of Patent: *Feb. 26, 2019

(54) MATCHING ENCODER OUTPUT TO NETWORK BANDWIDTH

(71) Applicant: Google Inc., Mountain View, CA (US)

(72) Inventors: Matthew Lloyd, New York, NY (US); Trausti Kristjansson, Hartsdale, NY (US)

(73) Assignee: GOOGLE LLC, Mountain View, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 14/282,985

(22) Filed: May 20, 2014

(65) Prior Publication Data

US 2014/0254613 A1 Sep. 11, 2014

Related U.S. Application Data

(63) Continuation of application No. 12/972,286, filed on Dec. 17, 2010, now Pat. No. 8,745,209.

(Continued)

(51) Int. Cl.
*G06F 15/173* (2006.01)
*H04L 29/06* (2006.01)
(Continued)

(52) U.S. Cl.
CPC ............ *H04L 69/04* (2013.01); *H04L 47/14* (2013.01); *H04L 47/38* (2013.01); *H04L 47/822* (2013.01);
(Continued)

(58) Field of Classification Search
CPC ....... H04L 69/04; H04L 47/14; H04L 47/822; H04W 28/18
(Continued)

(56) References Cited

U.S. PATENT DOCUMENTS 6,772,217 B1 * 8/2004 Baumann ................ H04L 47/10
370/395.41
7,002,992 B1 * 2/2006 Shaffer ............... H04M 7/0072
370/252
(Continued)

OTHER PUBLICATIONS

De Cicco, et al., "Skype Video Responsiveness to Bandwidth Variations," NOSSDAV '08 Proceedings of the 18th International Workshop on Network Operating Systems Support for Digital Audio and Video, 2008, 6 pages.
(Continued)

*Primary Examiner* — Anthony Mejia
(74) *Attorney, Agent, or Firm* — Lowenstein Sandler LLP

(57) ABSTRACT

Implementations include a method, systems, and computer program products for adaptively configuring codecs to transmit encoded data to better utilize available bandwidth of reachable networks. One implementation is a method of transmitting encoded data from a host to a target. The method includes, selecting a communication network reachable by the host, estimating an available bandwidth from the host to the target via the selected communication network, configuring a codec from a plurality of codecs implemented in the host according to the estimated available bandwidth, encoding data using the configured codec, and transmitting the encoded data to the target.

16 Claims, 8 Drawing Sheets

Related U.S. Application Data

(60) Provisional application No. 61/288,173, filed on Dec. 18, 2009.

(51) Int. Cl.

| | | |
|---|---|---|
| *H04L 12/801* | (2013.01) | |
| *H04L 12/811* | (2013.01) | |
| *H04W 28/18* | (2009.01) | |
| *H04L 12/911* | (2013.01) | |
| *G10L 19/24* | (2013.01) | |
| *H04W 88/06* | (2009.01) | |
| *H04L 12/24* | (2006.01) | |
| *H04L 12/26* | (2006.01) | |
| *H04L 12/729* | (2013.01) | |
| *H04L 12/709* | (2013.01) | |
| *H04L 12/825* | (2013.01) | |
| *H04L 12/807* | (2013.01) | |

(52) U.S. Cl.
CPC ............ *H04W 28/18* (2013.01); *G10L 19/24* (2013.01); *H04L 41/0896* (2013.01); *H04L 43/08* (2013.01); *H04L 43/0829* (2013.01); *H04L 43/0864* (2013.01); *H04L 43/16* (2013.01); *H04L 45/125* (2013.01); *H04L 45/245* (2013.01); *H04L 47/10* (2013.01); *H04L 47/25* (2013.01); *H04L 47/27* (2013.01); *H04W 88/06* (2013.01)

(58) Field of Classification Search
USPC ......................................................... 709/224
See application file for complete search history.

(56) References Cited

U.S. PATENT DOCUMENTS

| | | | | |
|---|---|---|---|---|
| 7,047,309 B2* | 5/2006 | Baumann | ................ | H04L 47/10 370/395.41 |
| 7,058,059 B1* | 6/2006 | Henry | ................ | H04W 88/182 370/395.1 |
| 7,457,312 B2* | 11/2008 | Weiss | ................ | H04L 47/722 370/468 |
| 7,460,480 B2* | 12/2008 | Awais | ................ | H04L 29/06027 370/235 |
| 7,477,638 B1* | 1/2009 | Kumar | ................ | H04L 12/5601 370/356 |
| 7,627,663 B2* | 12/2009 | Salesky | ................ | G06F 3/1415 709/223 |
| 7,702,817 B2* | 4/2010 | Rodriguez | ........ | H04W 72/0413 709/203 |
| 7,796,576 B2* | 9/2010 | Jalali | ................ | H04J 13/0048 370/230 |
| 7,825,915 B2* | 11/2010 | Choi | ................ | G09G 5/363 345/204 |
| 7,873,074 B1* | 1/2011 | Boland | ................ | H04L 12/14 370/468 |
| 7,987,284 B2* | 7/2011 | Ogawa | ................ | H04L 47/10 709/233 |
| 7,991,881 B2* | 8/2011 | Qian | ................ | H04L 12/2602 370/229 |
| 8,171,154 B2* | 5/2012 | Vonog | ................ | G06F 3/1454 382/276 |
| 8,301,725 B2* | 10/2012 | Biderman et al. | ............................ H04N 7/17318 709/217 | |
| 8,392,529 B2* | 3/2013 | Westerhoff | ........ | G06F 17/30091 709/219 |
| 2002/0099844 A1* | 7/2002 | Baumann | ................ | H04L 47/10 709/232 |
| 2003/0123394 A1* | 7/2003 | Neale | ................ | H04B 7/18582 370/235 |
| 2003/0224780 A1* | 12/2003 | Rodman | ................ | H04L 12/66 455/426.1 |
| 2005/0002379 A1 | 1/2005 | Bye | | |
| 2005/0004793 A1* | 1/2005 | Ojala | ................ | G10L 21/038 704/219 |
| 2005/0154921 A1* | 7/2005 | Medvinsky | ............. | G06F 21/10 726/4 |
| 2005/0201414 A1* | 9/2005 | Awais | ................ | H04L 29/06027 370/468 |
| 2006/0104313 A1* | 5/2006 | Haner | ................ | H04L 47/10 370/517 |
| 2006/0218264 A1* | 9/2006 | Ogawa | ................ | H04L 47/10 709/223 |
| 2006/0230134 A1* | 10/2006 | Qian | ................ | H04L 67/36 709/224 |
| 2006/0256810 A1* | 11/2006 | Yarlagadda | ........ | H04L 29/06027 370/465 |
| 2007/0133441 A1* | 6/2007 | Kang | ................ | H04W 28/18 370/282 |
| 2007/0140116 A1* | 6/2007 | Vega-Garcia | ..... | H04L 29/06027 370/230 |
| 2007/0168534 A1* | 7/2007 | Hiltunen | ............. | H04N 21/235 709/230 |
| 2008/0043643 A1* | 2/2008 | Thielman | ............. | H04N 19/196 370/260 |
| 2008/0046549 A1* | 2/2008 | Saxena | ................ | H04L 43/026 709/223 |
| 2008/0085712 A1* | 4/2008 | Han | ................ | H04W 36/04 455/440 |
| 2008/0130511 A1* | 6/2008 | Koo | ................ | G10L 19/24 370/252 |
| 2008/0130658 A1* | 6/2008 | Chakareski | ............. | H04L 47/10 370/395.42 |
| 2009/0193512 A1* | 7/2009 | Buckley | ............ | H04L 29/12047 726/9 |
| 2009/0222553 A1* | 9/2009 | Qian | ................ | H04L 12/2602 709/224 |
| 2009/0222555 A1* | 9/2009 | Qian | ................ | H04L 41/5003 709/224 |
| 2010/0002584 A1* | 1/2010 | Jalali | ................ | H04J 13/0048 370/235 |
| 2010/0238834 A9* | 9/2010 | Awais | ................ | H04L 29/06027 370/253 |
| 2010/0268524 A1* | 10/2010 | Nath | ................ | H04L 67/306 703/23 |
| 2011/0013516 A1* | 1/2011 | Black | ................ | H04L 43/0888 370/236 |
| 2011/0078532 A1* | 3/2011 | Vonog | ................ | G06F 3/1454 714/752 |
| 2014/0105041 A1* | 4/2014 | Swaminathan | ....... | H04L 1/0002 370/252 |

OTHER PUBLICATIONS

International Search Report and Written Opinion of the International Search Authority for International Application No. PCT/US2010/061085, dated Mar. 10, 2011, 12 pages.

PCT, Notification Concerning Transmittal of International Preliminary Report on Patentability (Chapter I of the Patent Cooperation Treaty), in International application No. PCT/US2010/061085, dated Jun. 28, 2012.

\* cited by examiner

MATCHING ENCODER OUTPUT TO NETWORK BANDWIDTH

CROSS REFERENCE TO RELATED APPLICATIONS

This application is a continuation of U.S. patent application Ser. No. 12/972,286, filed Dec. 17, 2010, and claims the benefit of U.S. provisional application No. 61/288,173, filed on Dec. 18, 2009, which is hereby incorporated by reference in its entirety.

BACKGROUND

Technical Field

Implementations relate to the transmission of encoded data over a communication network.

Background Art

Mobile computing devices, such as smartphones, tablet computers, netbook computers, laptop computers, and the like, exchange data with servers and other computers over communication networks in order to provide access to a wide variety of applications regardless of the users' location. A mobile computing device typically establishes a wireless connection with a nearby wireless access point. Data can then be transmitted via the wireless network connection to a target node.

Mobile computing devices may have the capability to connect to one or more networks. For example, a mobile computing device can have separate interfaces for a third generation cellular network (3G network), an IEEE 802.11 wireless data network (WIFI network), a Bluetooth network, and an Ethernet. At any instant, the mobile computing device can be connected to one or more reachable networks, and may be sending or receiving data over those networks. However, each of these networks and/or each of the mobile computing device's network interfaces may have different bandwidth capabilities. For example, the bandwidth available to a node in a WIFI network can differ based on the network access point, the distance from the network access point to the mobile node, and other factors. The bandwidth of the network is a key factor in determining the rate at which data is to be transmitted over that network.

Mobile computing devices with multiple network interfaces typically have a prioritized preference ordering for the networks that are reachable, and can select a network for an application based upon the predetermined preference ordering. Applications are typically configured to transmit data at a rate corresponding to a notional bandwidth for the respective type of network. For example, a voice codec may be configured to transmit encoded voice data at different rates depending on the network interface that is active at the time. Applications such as voice coding are bandwidth sensitive, i.e., the quality or fidelity of the voice that can be recovered from the encoded voice can decrease when the encoding is configured to correspond to lower bandwidth. Therefore, a voice codec configured to transmit at a predetermined rate for Will, may not be able to utilize the full bandwidth available in various WIFI networks.

SUMMARY

Methods and systems are provided for applications transmitting encoded data to adaptively configure its output according to the available network bandwidth of reachable networks. One implementation is a method of transmitting encoded data from a host to a target. The method includes, selecting a communication network reachable by the host, estimating an available bandwidth from the host to the target via the selected communication network, configuring a codec from a plurality of codecs implemented in the host according to the estimated available bandwidth, encoding data using the configured codec, and transmitting the encoded data to the target.

Another implementation is a host communication device which includes at least one processor, at least one network interface coupled to the processor, at least one codec coupled to the processor and to the at least one network interface, a network detection module, an available bandwidth estimation module, and a codec configurator. The network detection module is configured to select a communication network reachable through the at least one network interface. The available bandwidth estimation module is configured to estimate, based upon the selected network and a target, an available bandwidth from the host communication device to the target via the selected communication network. The codec configurator can configure one of the codecs to encode data according to the estimated available bandwidth.

A further implementation is a computer program product comprising a tangible computer useable medium having control logic stored therein for causing a host communication device to transmit encoded data. The computer control logic includes first computer program code for selecting a communication network reachable by the host, second computer program code for estimating an available bandwidth from the host to the target via the selected communication network, third computer program code for configuring, according to the estimated available bandwidth, a codec from a plurality of codecs implemented in the host, fourth computer program code for encoding data using the configured codec, and fifth computer program code for transmitting the encoded data to the target.

Further features and advantages of various implementations, as well as the structure and operation thereof, are described in detail below with reference to the accompanying drawings. It is noted that implementations are presented herein for illustrative purposes only. Additional implementations will be apparent to persons skilled in the relevant art(s) based on the teachings contained herein.

BRIEF DESCRIPTION OF THE DRAWINGS/FIGURES

Reference will be made to example implementations which may be illustrated in the accompanying figures. These figures are intended to be illustrative, not limiting.

DETAILED DESCRIPTION

While illustrative implementations for particular applications are described herein, it should be understood that implementations are not limited thereto. Those skilled in the art with access to the teachings herein will recognize, additional modifications, applications, and implementations within the scope thereof and additional fields in which the implementations would be of significant utility.

Overview

Figure 1:
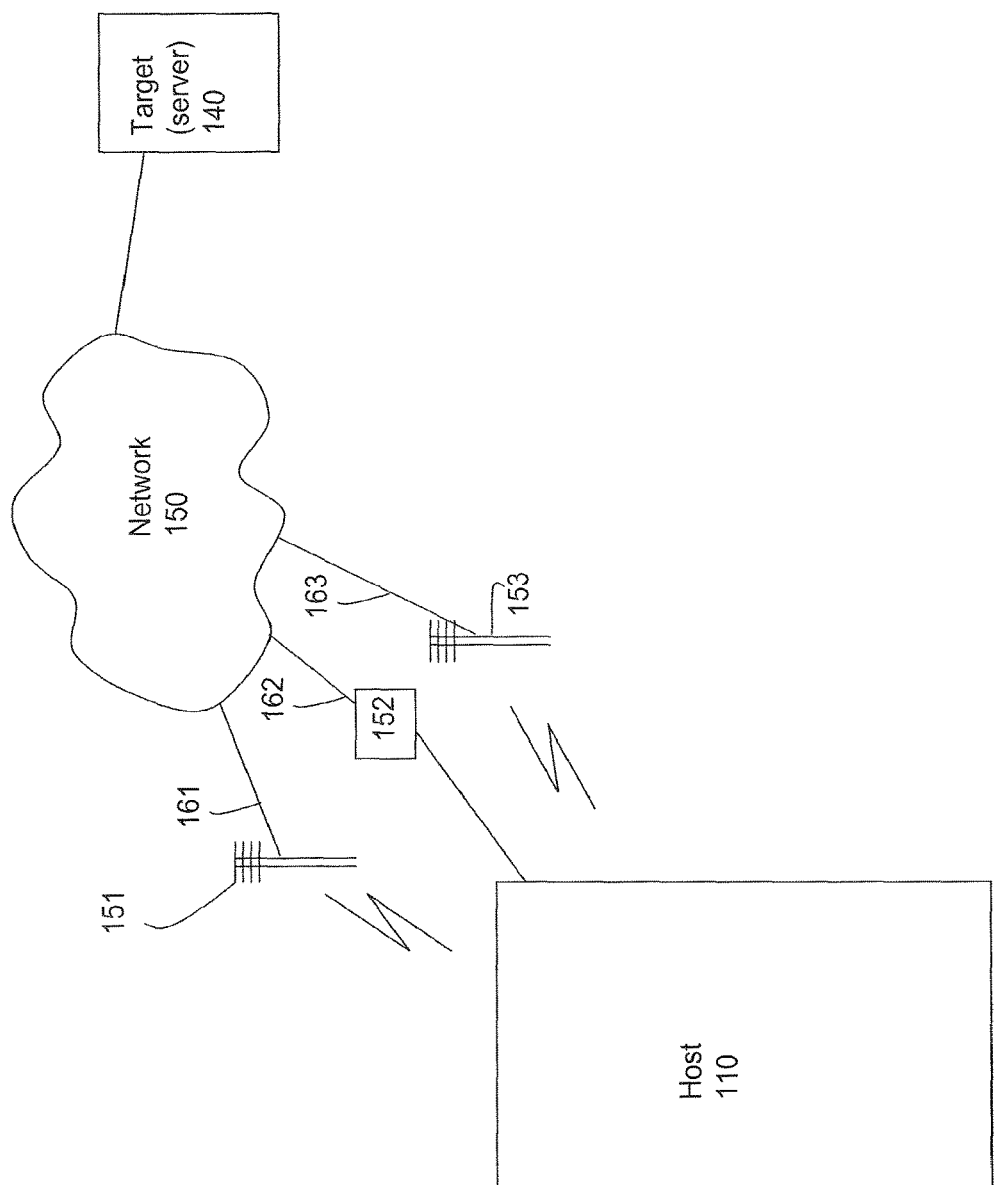
FIG. 1 is a block diagram of a system to match application output to network bandwidth, according to an implementation of the present disclosure.

Implementations include methods and systems for adaptively configuring applications on mobile computing devices to take advantage of the available bandwidth of various networks. FIG. 1 illustrates a system 100 according to an implementation. A host 110 communicates with a target 140 over a network 150. Network access points 151, 152, and 153 may respectively provide access to a 3G network 161, Ethernet 162 or WIFI 163 network, which in turn can connect to network 150. Host 110, based upon its current location, may connect to network 150 via one or more network access points 151, 152, or 153. The term "network access point," as used herein, is intended to mean a wireless base station, WIFI access point, wired or wireless router and/or other gateway device that connects a host to network 150. Access networks, such as access networks 161, 162, and 163, are considered part of network 150 that provides end-to-end communication connectivity from host 110 to target 140.

Each of these access networks 161, 162, and 163 can have different data carrying capabilities. Furthermore, the actual bandwidth available from host 110 to target 140 may differ based upon various aspects of the entire path from the host mobile computing device 110 to the target 140, including the path through network 150. Implementations can configure applications, such as a codec 216 (FIG. 2), that are implemented in host 110 to advantageously use more of the actual available bandwidth.

Network 150 can include one or more networks such as wide area networks and local area networks that have data carrying capabilities. In an implementation, network 150 is an Internet Protocol (IP) based packet switched network such as the Internet. Network 150 can also include one or more circuit switched networks.

Target 140 is a device communicatively coupled directly or indirectly to network 150. Target 140 can be any computer, a server, a server farm, a computer cluster, or the like. In an implementation, target 140 is a voice processing server. For example, target 140 can receive encoded voice or other audio data packets from various hosts, where the target processes the received encoded audio to determine a user's spoken commands and/or requests. The target can then generate one or more instructions based upon the processed commands or requests. Such instructions generated by processing the user's spoken commands and/or requests may be input to a map server or the like to enable voice commands. For example, a user may request driving directions by issuing a voice command such as "nearest Italian restaurant." Target 140 can include functionality to receive and process encoded audio and functionality to perform enhanced processing using metadata associated with the received encoded audio. In other implementations, target 140 can include functionality to receive and process other data and/or encoded data such as video, MP3, and the like.

Figure 2:
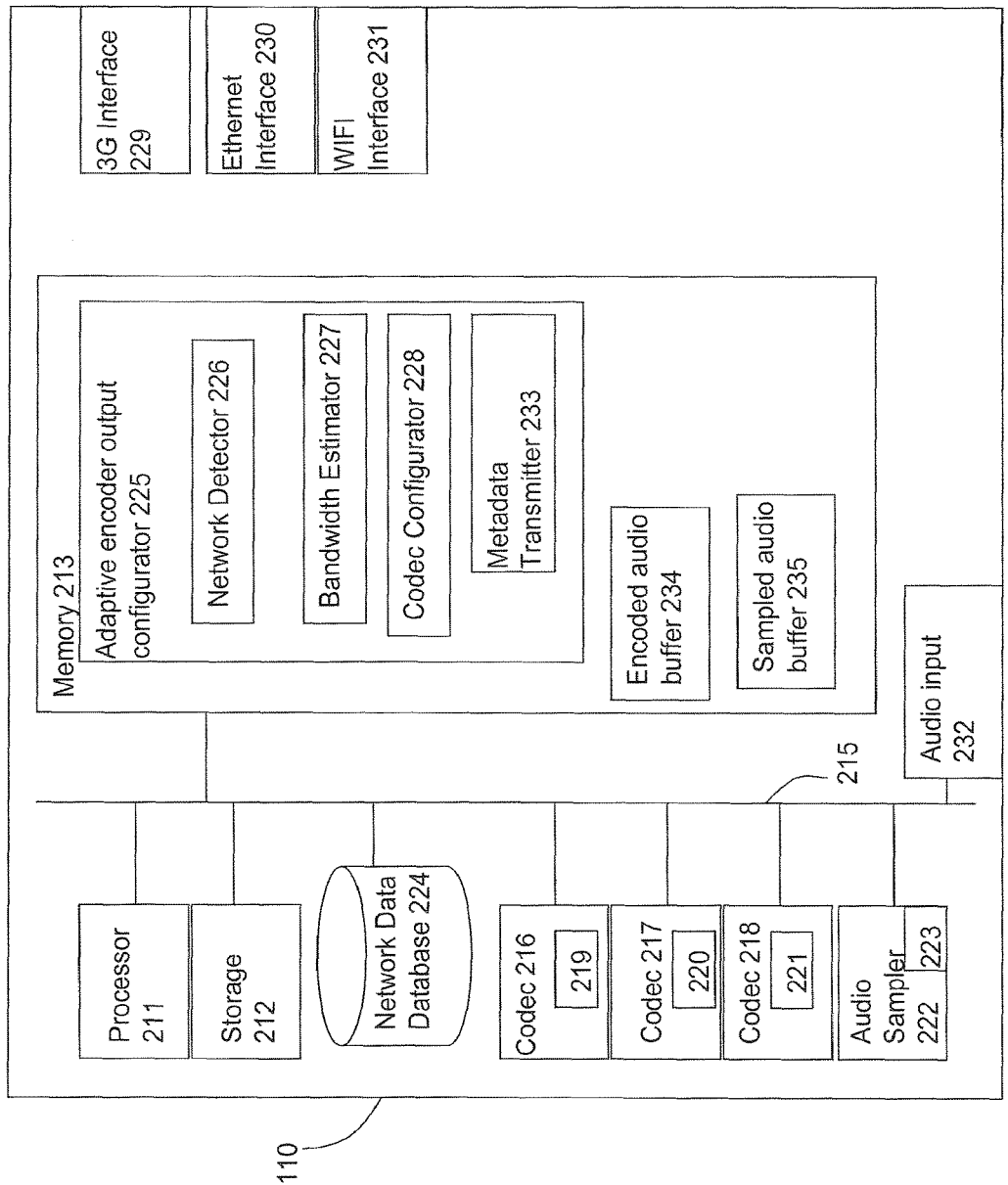
FIG. 2 is a block diagram of a host device, according to an implementation of the present disclosure.

Host 110 can be any computing device including, but not limited to, a mobile computing device such as a smartphone, tablet or netbook computer. Host 110 includes the functionality to select a preferred network from a plurality of networks, to determine the available bandwidth to a target device, and to configure a codec from a plurality of codecs to adaptively utilize the available bandwidth to the target over the preferred network. FIG. 2 illustrates a host 110 according to art implementation.

As shown in FIG. 2, host 110 can include one or more processors 211, one or more storage devices 212, one or more memory 213, a plurality of codecs 216, 217, and 218, an audio sampling module 222, an audio input 232, and one or more network interlaces 229, 230, and 231. One or more processors 211 can include general or specially designed processors, field programmable gate arrays (FPGA), application specific integrated circuit (ASIC), digital signal processor (DSP), and the like. Storage devices 212 can include one or more computer readable medium such as a hard drive, a flash memory, a digital video disk (DVD), and like non-volatile memory devices. Memory 213 can include a volatile memory such as dynamic random access memory (DRAM). Communication infrastructure 215, such as a Peripheral Component interconnect (PCI) bus or the like, interconnects the various modules of host 110.

Codecs 216, 217, and 218 can include codecs of the same or different types. Codecs 216, 217, and 218 include the functionality to receive data and to encode the received data. In an implementation, codecs 216, 217, and 218 are audio codecs that receive sampled audio and output encoded audio. Codecs 216, 217, and 218 can be implemented in hardware, software, or a combination thereof. An example lossless codec is Free Lossless Audio Codec (FLAC) available at http://flac.sourceforge.net. An example lossy codec is SPEEX which is available at http://www.speex.org. Other lossless codecs and lossy codecs are available. In another implementation, codecs 216, 217, and 218 may be video, MP3 or other codecs. Each codec 216, 217, and 218 can also have one or more configuration parameters, respectively 219, 220, and 221. Configuration parameters for respective codecs can include encoding rate, sampling rate on input, quality parameters and the like. Audio sampler 222 includes the functionality to sample audio received through audio input 232. In an implementation, audio sampler 222 is integrated with codecs 216, 217, and 218. Audio sampler 222 can include configurable parameters 223, such as sample rate. Audio input 232 can include a microphone.

Network interfaces 229, 230, and 231 enable host 110 to communicatively couple with other nodes over various networks. In an implementation, interface 229 can be a cellular data interface such as 3G, EDGE, WiMax and the like, 230 can be an Ethernet, and 231 can be a WIFI interface. Based on one or more of configuration, host environment, and user preferences, host 110 selects an interface 229, 230 or 231 through which to connect to target 140 over one of the access networks 161, 162, and 163, and network 150. Network interfaces 229, 230, and 231 can include hardware and/or software modules implementing its functionality.

Host 110 also includes adaptive encoder output configurator 225. Adaptive encoder output configurator 225 includes the functionality to adaptively configure the output of the respective encoders such that the encoder output is matched with the available bandwidth to a target coupled over a network. Adaptive encoder output configurator 225 may be implemented in hardware, firmware, software, or using a combination thereof. According to an implementation, adaptive encoder output configurator 225 includes a network detector 226, a bandwidth estimator 227, a codec configurator 228, and a metadata transmitter 233. In an implementation, when executing, adaptive encoder output configurator 225 can reside in memory 213. The instructions implementing adaptive encoder output configurator 225 can be stored in storage 212.

In implementations, memory 213 also includes an encoded audio buffer 234 to temporarily hold the output of codecs 216, 217, and 218, and a sampled audio buffer 235 to temporarily hold sampled audio prior to being encoded. The size of the buffers 234 and 235 can be determined based on a number of factors including total memory constraints, expected input rate, and expected output rate.

Host 110 can also include a network characteristics database 224. The term "database" is used herein to mean any structured collection of data, and may or may not include database management systems. Network characteristics database 224 can be used to store configured and learned information about access networks and about accessing a target node through the access networks. In an implementation, database 224 can include entries for respective pairings of an access network and target. In some implementations, adaptive encoder output configurator 225 accesses database 224 to determine properties of one or more access networks. Adaptive encoder output configurator 225 can also update database 224 with newly learned properties of access networks.

Network detector 226 includes the functionality to detect access networks to which host 110 can communicatively couple. For example, network detector 226 can detect when host 110 is within the respective ranges of 3G wireless base station 151 and/or WIFI access point 153. Network detector 226 also includes the functionality to select one, in some implementations more than one, of the currently reachable access networks as the active network. The functionality of network detector 226 is further described below with respect to FIG. 4.

Bandwidth estimator 227 includes the functionality to determine the available bandwidth through the active access network to a predetermined target. Bandwidth estimator 227 can determine an available bandwidth based on looking up a record in database 224 and also by actively measuring the performance characteristics of the network. Bandwidth estimator 227 is further described with respect to FIG. 3 below.

Codec configurator 228 includes the functionality to select a codec with characteristics matched to the determined available bandwidth, and to adjust various configurable parameters of the selected codec to advantageously utilize the available bandwidth. For example, codec configurator module 228 can attempt to use lossless encoding of audio whenever the necessary bandwidth is available. The functionality of the codec configurator 228 is further described below in FIGS. 4 and 6.

Metadata transmitter 233, in an implementation, includes the functionality to collect metadata associated with the encoded audio data. In an implementation, for example, with each audio data unit, a short duration before and after the encoded audio data may be transmitted to the target as metadata. The receipt of such metadata enables the receiver, such as target 140, to perform higher fidelity decoding of the received encoded data.

Figure 3:
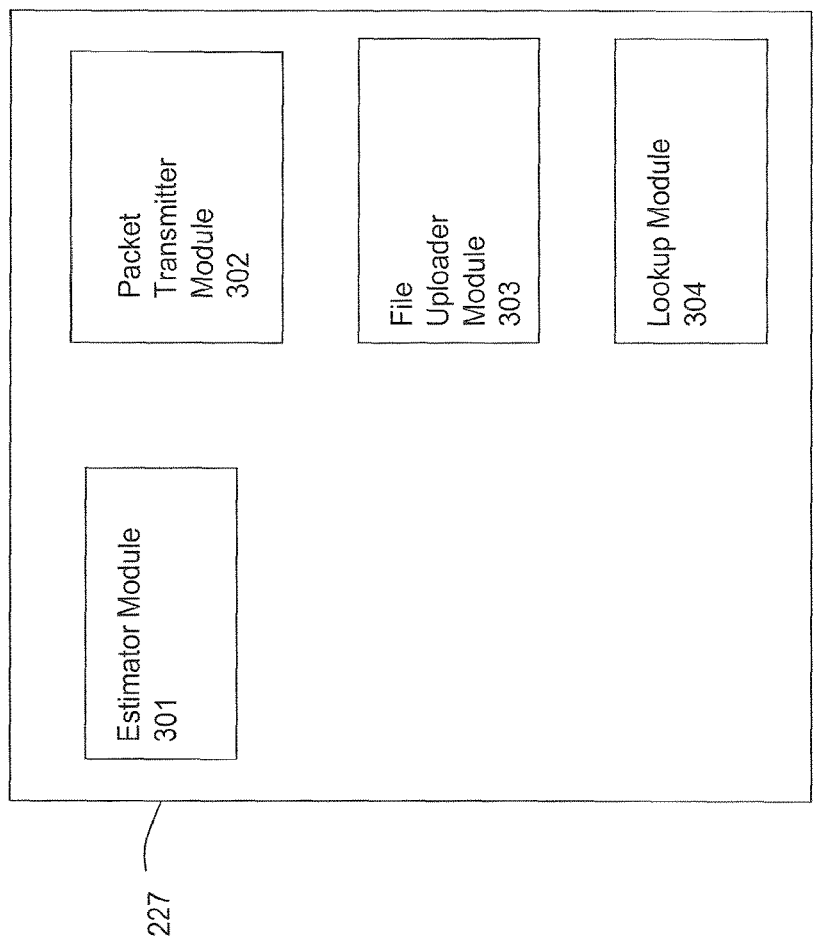
FIG. 3 is a block diagram of a bandwidth estimator, according to an implementation of the present disclosure.

FIG. 3 illustrates bandwidth estimator 227, according to an implementation. Bandwidth estimator 227 can include estimator module 301, a packet transmission measuring module 302, a file upload measurement module 303, and database lookup module 304.

Estimator module 301 includes the functionality to receive estimated bandwidth measurements to the target from one or more measurement modules 302-304 and to make a final estimate of the available bandwidth. Estimator module 301 can include the functionality to retrieve and consider one or more network properties previously stored in database 224, in determining the final available bandwidth estimate.

Packet transmission measurement module 302 includes the functionality to measure network properties to the target by transmitting packets with various time and size characteristics. Packet transmission measurement module 302 is described in further detail with respect to FIGS. 4, 5, and 7.

File upload measurement module 303 includes the functionality to measure network properties by uploading files of various sizes to the target and observing network characteristics. File upload measurement module 303 is further described below with respect to FIGS. 4, 5, and 8.

Network server lookup module 304 includes the functionality to access a remote server, such as target 140 which may have access to a database of network characteristics, in order to get an estimate of the network bandwidth to target. Network server lookup module 304 is further described below with respect to FIG. 7.

Method

Figure 4:
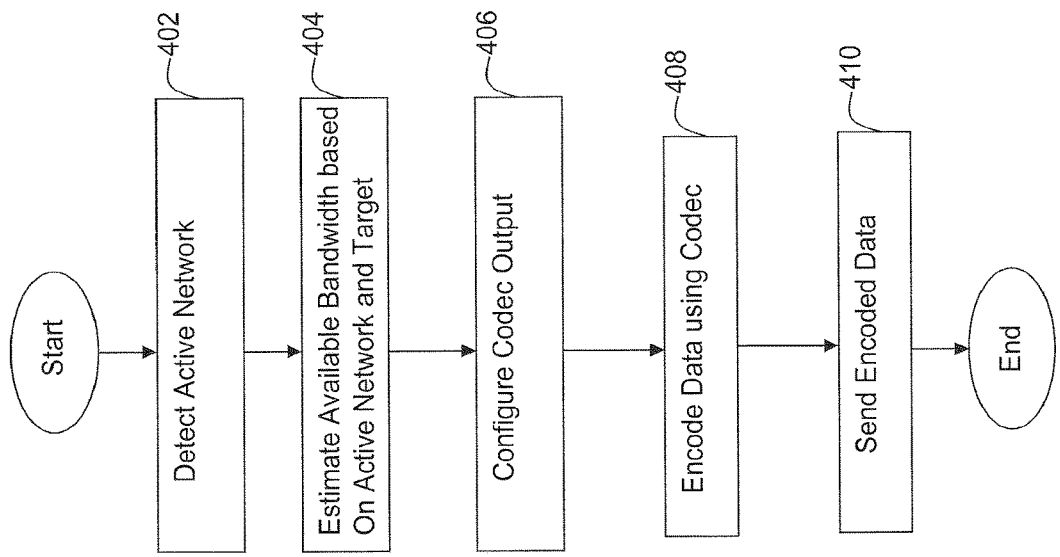
FIG. 4 is a flowchart of a method to adaptively configure the sending of encoded data from a host to a target, according to an implementation.

FIG. 4 is a flowchart of a method 400 of sending encoded data from a host to a target, according to an implementation. Method 400 can be implemented by, for example, adaptive encoder output configurator 225. In step 402, an active network to which the host is currently connected is determined. Step 402 can include monitoring of each network interlace of the host to determine if a network is currently reachable from any of the respective interlaces. If more than one network is currently available through its corresponding interface on the host, then a determination has to be made as to which network is the "active network," i.e., the network through which data communication, or more particularly, the majority of the host's outgoing data communication, will be sent. It should be understood, however, that communication can occur over more than one interface at a time. Simultaneously, such as, for example, simultaneously routing voice telephony traffic over the host's 3G network while routing data raffle over a WIFI network where one is available.

Each network interface may determine if it is currently connected to a communication network, and if connected, an identity of that network. For example, Ethernet interlace 230 on host 110 can electrically detect when it is connected to a Ethernet network. If a connection is detected, the Ethernet interface 230 or other module on host 110 can determine a gateway associated with the connected Ethernet as the identifier for that network. Similarly, 3G network interface 229 and WIFI interface 231 can determine the networks they are respectively connected to, if any, by either passively monitoring for broadcasts from a base station or access point, or by actively broadcasting its request. If, for example, a connection is detected on 3G interface 229, then the identity of a corresponding base station 151 can be determined by exchanging protocol messages or the identity may be included in a broadcast received from the base station. If for example, a connection is detected on WIFI interface 231, then the identity of the WIFI access point or the identity of the particular network, e.g., the SSID of the network, can be determined through various known methods.

Selection of a network as the active network may be based on one or more of a preference configuration and dynamically determined characteristics of each network. For example, host 110 may have a preference configuration that specifies that a WIFI network, is preferably elected over a 3G network for data communication, and that an Ethernet network is preferably elected over a WIFI network. Host 110 may also dynamically determine that the WIFI network to which it is connected to currently has less bandwidth, than the 3G network, for example, through information already available at network interface 231 when it establishes connection to a WIFI network. Thus, host 110 may decide to select the 3G network interface as the active network if the connected WIFI interface is of low bandwidth, or to select the WIFI network as the active network if the WIFI network currently offers a higher bandwidth than the 3G network interface. Step 402 can be implemented by, for example, network detector 226.

In step 404, the bandwidth available through the active network to a target is determined. For example, if the WIFI network reached through WIFI network access point 153 is determined to be the current active network, then the bandwidth available from host 110 to target 140 through access network 163 and network 150 is determined. Implementations may use one or more active bandwidth estimation methods by communicating with target 140, and/or can utilize previously learned or configured information related to the access network and the target, which is stored in a database. Step 404 is further described below with respect to FIG. 5. Step 404 can be implemented by, for example, bandwidth estimator 227.

In step 406, a codec is selected and configured to better utilize the bandwidth available on the active network. In an implementation, when sufficient bandwidth is available, a lossless codec is selected, whereas when sufficient bandwidth is not available, a lossy codec is selected to encode voice. In configuring the selected codec to more fully utilize the bandwidth available on the active network, several configurable parameters may be adjusted to achieve an output rate of the codec that is optimal for the current available bandwidth. Step 406 is further described with respect to FIG. 6. Step 406 can be implemented by, for example, codec configuration module 227.

In step 408, the incoming voice data is sampled and encoded using the selected codec and configuration settings, to output encoded data. The encoded data is then transmitted, in step 410, to the target. In transmitting the encoded data, host 110, or more particularly metadata transmitter 233, may determine that there is sufficient bandwidth in excess of what is required for the encoded data, and that additional information referred to herein as "metadata" can be transmitted. The metadata that is transmitted can include noise measurements, buffered voice pre and post the encoded samples that are being transmitted, and the like. To obtain data prior to receiving the voice data, the device can continuously record audio into a buffer. The buffer can contain a few seconds of the most recent audio. The audio in the buffer can be transmitted in its entirety, or a characterization of the audio can be computed and transmitted. The characterization, for example, can be the average spectral shape, the average and variance of each spectral component of more complex models such as a Gaussian mixture model that compactly represents the characteristics of the noise environment. Buffered data may be retrieved from, for example, encoded audio buffer 234 or sampled audio buffer 135. Other information that characterizes the noise environment can also be transmitted as metadata. Such metadata may be provided to the target so that the target may perform processing such as noise removal and the like, which increases the fidelity of the encoded data received at the target. Steps 408 and 410 can be implemented by codecs 216, 217, and 218, and network interfaces 229, 230, and 231.

Figure 5:
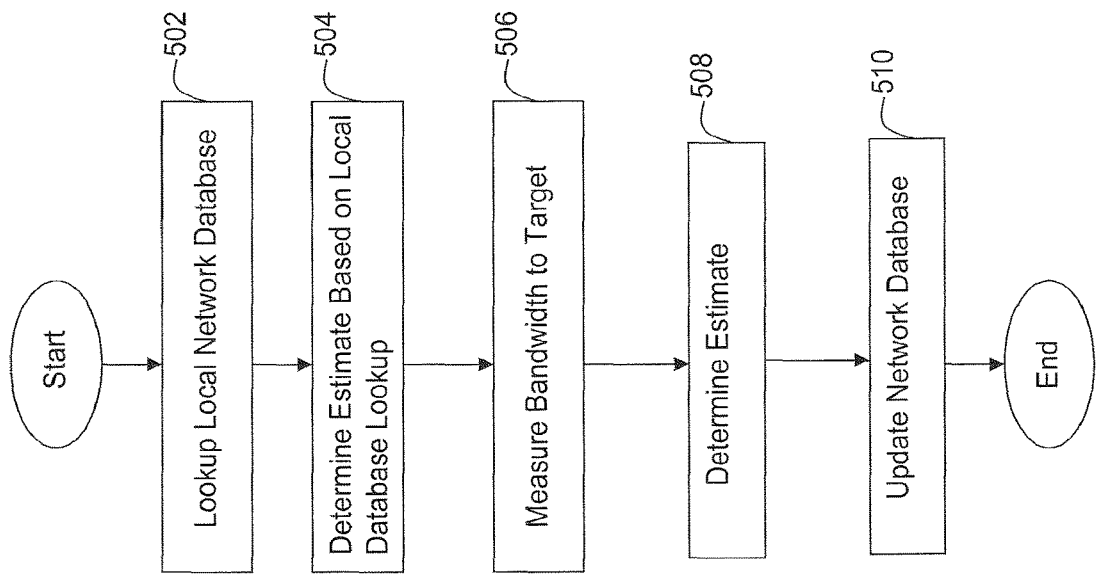
FIG. 5 is a flowchart of a method of bandwidth estimation, according to an implementation.

FIG. 5 illustrates bandwidth estimation according to an implementation. In step 502, a database is looked up to determine if any record exists of the current active network and target. For example, database 224 may be accessed using the SSID of the WIFI network which is the current active network and the identifier for target 140. Similarly, a 3G network identifier can be used if the active network is a 3G network, and a network gateway address can be used if the active network is an Ethernet network. It should be understood, however, that database 224 can be structured and accessed in numerous ways to retrieve information based on a specified network identifier and node identifier. Each record may associate a network identifier, a target node, an estimated available bandwidth, and any actual transfer performance characteristics.

In step 504, the information retrieved in step 502 is analyzed to determine a bandwidth estimation. Several methods can be used to determine a bandwidth estimation based upon the information retrieved. According to an implementation, the retrieved information can be analyzed to arrive at an average bandwidth available estimation for alt records having timestamps within a relevant time range. Another implementation may base the estimation on the most recent estimation in the database. In another implementation, records may be filtered based on the accuracy of the estimated bandwidth compared to the actual transfer performance characteristics that were measured, before selecting records for the determination of the current bandwidth estimation. In other implementations, the retrieved information is analyzed to statistically determine a mean bandwidth available estimation. Other ways of arriving at a bandwidth estimation are possible and are contemplated within the teachings in this disclosure.

Figure 7:
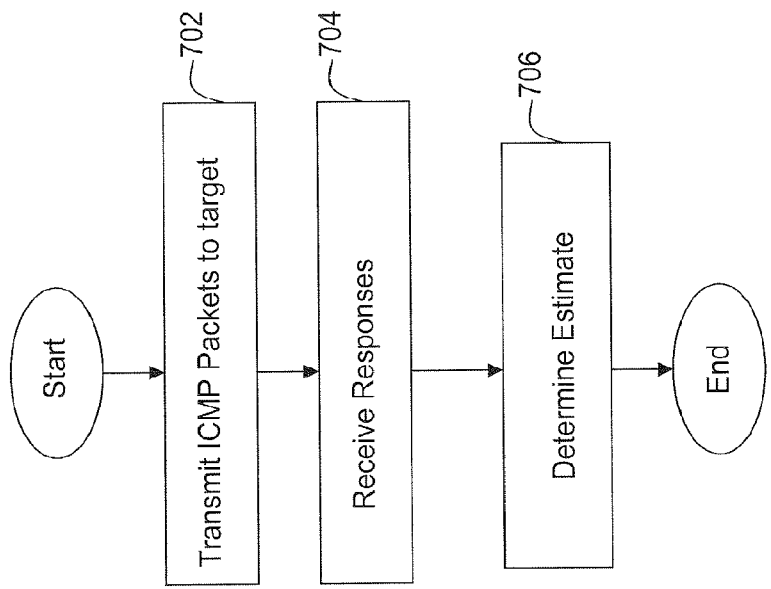
FIG. 7 is a flowchart of a method of measuring network bandwidth, according to an implementation.
Figure 8:
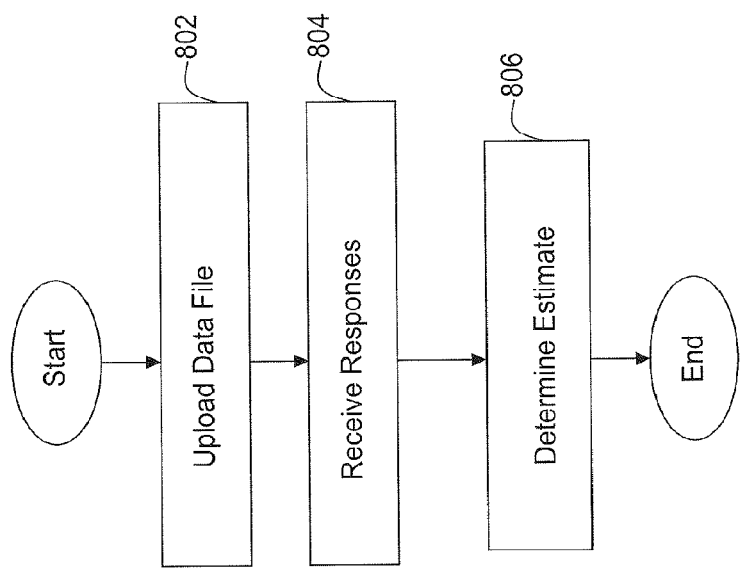
FIG. 8 is a flowchart of a method of measuring network bandwidth, according to an implementations.

In step 506, host 110 actively measures one or more network performance metrics by communicating with the target. For example, host 110 may send a sequence of packets or files to target 140 over the currently active network and monitor the resulting responses and/or related buffer characteristics. FIGS. 7 and 8 illustrate methods of actively measuring network performance metrics in step 506 according to implementations. In another implementation, an external database is queried to determine a current estimation of the bandwidth to the target over a specified access network.

In step 508, the bandwidth estimations based on database 224 and bandwidth estimations based on active measurements are combined to determine a final available bandwidth estimate. In an implementation, combining the measurements entails computing a weighted sum of the two bandwidth estimates. The weightings may be determined based on a determined reliability of the estimation from the database. For example, as database 224 collects more and more estimations over time, the reliability attributed to the estimations based on the database records can be increased.

In step 510, optionally, database 224 is updated by writing the newly determined reliability estimate. Note that, over time, updates made in this manner would increase the reliability of the database 224 as an estimation source. Furthermore, after the actual transfer events have taken place, the corresponding database record can be updated with the actual transfer performance characteristics, so that the accuracy of the estimation can be determined.

Figure 6:
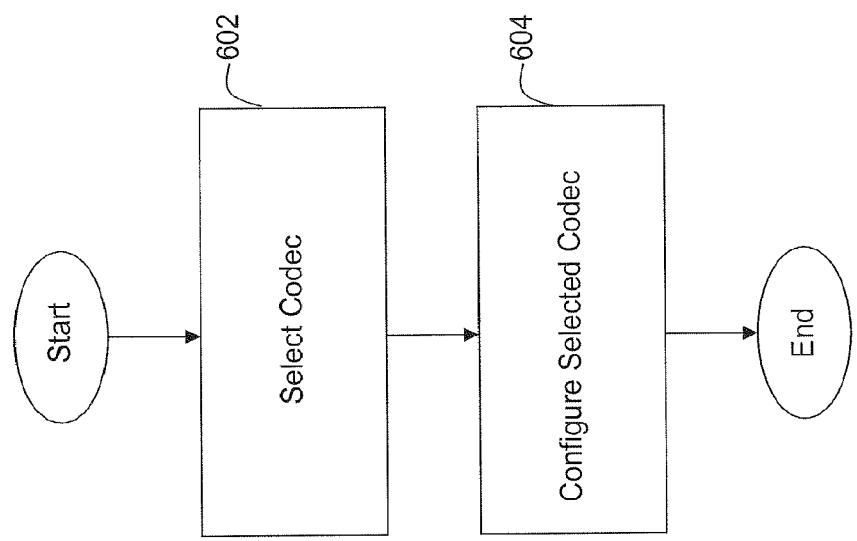
FIG. 6 is a flowchart of a method of configuring a codec, according to an implementation.

FIG. 6 illustrates the configuration of a codec, according to an implementation. In step 602, a codec is selected from a plurality of codecs. For example, if the estimated bandwidth is sufficient, a lossless codec can be selected, and otherwise a lossy codec with a output rate that is closely matched to the available bandwidth can be selected. For example, based on the estimated available bandwidth, FLAC can be selected if the estimated available bandwidth is sufficiently large, and SPEEX can be used otherwise. By comparing the bandwidth of the compressed audio output from the codec to the estimated available bandwidth for each combination of codec and codec configurable settings, the combination having the highest audio quality and a bit rate smaller than the available upload bandwidth can be identified.

In step 604, one or more configurable parameters of the selected codec are adjusted to more fully utilize the available bandwidth. In an implementation, the quality of the audio that is input to the codec is adjusted. For example, the audio sampler can be configured to sample audio at a sampling rate of 16 kHz instead of 8 kHz if the estimated available bandwidth is sufficiently large. In another implementation, one or more configurable parameters such as a quality parameter that adjusts the tradeoff between bandwidth and the amount of distortion introduced into the audio is adjustable to match the codec output to the estimated available bandwidth.

FIG. 7 illustrates a method of actively measuring available bandwidth by transmitting a plurality of data units, or packets, to the target. For example, in step 702, a series of data packets may be transmitted from the host to target using Internet Control Message Protocol (ICMP) echo protocol. According to one implementation, a predetermined number of relatively small ICMP packets can be sent at predetermined intervals. In step 704, responses to the ICMP packets are received. Based on the responses received from the target, in step 706, the following can be determined: (a) the fraction of the ICMP packets or responses that are lost; (b) the mean round-trip-time for each ICMP packet; and (c) the standard deviation of the round trip-times for each ICMP packet. Although these measures may not be directly determined by the available bandwidth, the performance characteristics of the small amount of data compared to the available bandwidth of the upload pipe are reflective of the available bandwidth in the network. For example, slow networks generally cause higher fractions of packet loss and round-trip-times that have a higher mean and standard deviation. Thus, by setting a threshold on the fraction of lost packets, the round trip time, and the standard deviation of the round-trip time, a determination as to whether the network is 'fast' or 'slow' can be made. For example, if N packets are sent and R corresponding responses are received, and the round-trip-times for the R packets are $RTT_i$ for i=1 . . . R (in seconds), then the network may be considered 'fast' if: R/N>=response_rate_threshold && mean($RTT_i$ for i=1 . . . R)<=mean_rtt_threshold && stdev($RTT_i$ for i=1 . . . R)<=stdev_rtt_threshold, where response_rate_threshold, mean_rtt_threshold, stdev_rtt_threshold are predetermined thresholds for the response rate, mean round-trip-time, and standard deviation, respectively, of the round-trip-time.

In another implementation, ICMP echo packets of varying sizes are sent addressed to the target, and the relationship between the size of the packet and the round-trip-time analyzed based on the responses received.

In yet another implementation, a sequence of ICMP echo packets of increasing size are sent addressed to the target. When the amount of traffic from the packets is less than the available bandwidth of the network, the round-trip-times of these packets should be substantially constant. When the bandwidth goes over or approaches the available bandwidth, subsequent packets will be increasingly delayed (assuming that the network is well represented by a single pipe of limited capacity). By determining the point when the packets start to be delayed, we can estimate the bandwidth. For example, if N packets are sent and R corresponding responses are received, the round-trip-times for the R packets are RTTi for i=1 . . . R (in seconds), and the sizes of the R packets are Si for i=1 . . . R, in bytes, then the available bandwidth of the connection can be estimated by computing the linear regression of RTTi(y) on Si(x), i.e., RTT=m*S+c, which yields a slope m with units of seconds per byte. The estimated available bandwidth based on the series of packets is then S/m in bytes per second.

FIG. 8 illustrates a method of actively measuring available bandwidth by transmitting or uploading one or more files to the target. In step 802, a file of a predetermined size is uploaded to the target. In step 804, one or more responses are received from the target. In step 806, based on the responses received, the time taken to upload the file is determined. For example, the actual time taken to upload a fixed amount of data to the target can be measured, and the available bandwidth can be estimated accordingly. In an implementation, starting with an initial estimate of the bandwidth of the network, the size of data uploaded to the target is varied such that each file is uploaded in a predetermined amount of time. The completion of the upload can be determined by various methods such as a message from the target, and/or by monitoring of the memory buffers in host 110. A custom protocol or a protocol such as File Transfer Protocol (FTP) or Tiny File Transfer Protocol (TFTP) can also be used to upload flies from host 110 to target 140. The calculation of the estimated available bandwidth, in one implementation, is based on the amount of uploaded data, S bytes, and the time taken for the upload, T seconds. Then the estimate of the bandwidth is simply S/T. One or more round-trip-times may need to subtracted from the total time based on the connection establishment handshakes required in the file upload protocol.

CONCLUSION

Implementations been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific implementations will so fully reveal the general nature of the disclosure that others can, by applying knowledge within the skill of the art, readily modify and/or adapt for various applications such specific implementations, without undue experimentation, without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary implementations, but should be defined only in accordance with the following claims and their equivalents.

What is claimed is:

1. A method comprising:
identifying a plurality of communication networks reachable by a host mobile device;
selecting, from the plurality of communication networks reachable by the host mobile device, a communication network providing higher bandwidth than one or more other communication networks of the plurality of communication network, the selecting being based on bandwidth characteristics of the plurality of communication networks;
obtaining from an external data store, one or more performance properties corresponding to the selected communication network;
measuring, by a processing device, one or more network performance metrics of the selected communication network using a plurality of data units sent from the host mobile device to a target via the selected communication network;
determining an estimated available bandwidth based on the measured network performance metrics, the performance properties obtained from the external data store, and a reliability attributed to the performance properties stored in the external data store;
configuring, by the processing device and according to the estimated available bandwidth, a codec selected from a plurality of codecs implemented in the host mobile device to achieve an output rate of the codec that is optimal for the available bandwidth from the host mobile device to the target via the selected communication network, the configuring comprises adjusting one or more parameters of the codec based upon the estimated available bandwidth;
encoding, by the processing device, data using the configured codec; and
transmitting, by the processing device, the encoded data to the target via the selected network.

2. The method of claim 1, wherein the obtaining comprises:
determining an identifier associated with the selected communication network; and
accessing the external data store using the identifier.

3. The method of claim 1, further comprising:
updating the external data store with the measured network performance metrics.

4. The method of claim 1, wherein the measuring comprises:
transmitting the plurality of data units to the target using the selected communication network;
receiving from the target a plurality of responses corresponding to the transmitted data units; and
determining the measured network performance metrics based upon at least one of the plurality of data units and the plurality of responses.

5. The method of claim 4, wherein the measured network performance metrics comprise at least one of a packet loss rate determined based upon the plurality of data units and the plurality of responses, or a mean round trip time for the plurality of data units and a standard deviation of the mean round trip time.

6. The method of claim 4, wherein the measuring comprises:
determining a relationship between size of respective said data units and corresponding round trip times.

7. The method of claim 1, wherein the measuring comprises:
transmitting a data file of predetermined size to the target using a file transfer protocol; and
determining a time required to transmit the file.

8. The method of claim 1, further comprising:
transmitting metadata associated with the encoded data to the target.

9. The method of claim 1, wherein the configuring comprises:
adjusting quality of data input to the codec based upon matching the estimated available bandwidth.

10. A host mobile device, comprising:
at least one network interface;
at least one codec communicatively coupled to the at least one network interface; and
at least one processor, coupled to the network interface and the codec, to:
identify a plurality of communication networks reachable by the host mobile device;
select, from the plurality communication networks reachable by the host mobile device, a communication network providing higher bandwidth than one or more other communication networks of the plurality of communication network, the selecting being based on bandwidth characteristics of the plurality of communication networks;
obtain from an external data store, one or more performance properties corresponding to the selected communication network;
measure one or more network performance metrics of the selected communication network using a plurality of data units sent from the host mobile device to a target via the selected communication network;
determine an estimated available bandwidth based on the measured network performance metrics, the performance properties obtained from the external data store, and a reliability attributed to the performance properties stored in the external data store;
configure, according to the estimated available bandwidth, a codec selected from a plurality of codecs implemented in the host mobile device to achieve an output rate of the codec that is optimal for the available bandwidth from the host mobile device to the target via the selected communication network, wherein to configure the codec, the at least one processor is to adjust one or more parameters of the codec based upon the estimated available bandwidth;
encode data using the configured codec; and
transmit the encoded data to the target via the selected network.

11. The device of claim 10, wherein the measured network performance metrics comprise at least one of a packet loss rate determined based upon the plurality of data units and the plurality of responses, or a mean round trip time for the plurality of data units and a standard deviation of the mean round trip time.

12. A non-transitory computer readable storage medium having instructions that, when executed by a processing device, cause the processing device to perform operations comprising:
identifying a plurality of communication networks reachable by a host mobile device;
selecting, from the plurality of communication networks reachable by the host mobile device, a communication network providing higher bandwidth than one or more other communication networks of the plurality of communication network, the selecting being based on bandwidth characteristics of the plurality of communication networks;
obtaining from an external data store, one or more performance properties corresponding to the selected communication network;
measuring one or more network performance metrics of the selected communication network using a plurality of data units sent from the host mobile device to a target via the selected communication network;
determining an estimated available bandwidth based on the measured network performance metrics, the performance properties obtained from the external data store, and a reliability attributed to the performance properties stored in the external data store;
configuring, according to the estimated available bandwidth, a codec selected from a plurality of codecs implemented in the host mobile device to achieve an output rate of the codec that is optimal for the available bandwidth from the host mobile device to the target via the selected communication network, the configuring comprises adjusting one or more parameters of the codec based upon the estimated available bandwidth;
encoding data using the configured codec; and
transmitting the encoded data to the target via the selected network.

13. The computer readable storage medium of claim 12, wherein the measuring comprises:
transmitting the plurality of data units to the target using the selected communication network;
receiving from the target a plurality of responses corresponding to the transmitted data units; and
determining the measured network performance metrics based upon at least one of the plurality of data units and the plurality of responses.

14. The computer readable storage medium of claim 13, wherein the measured network performance metrics comprise at least one of a packet loss rate determined based upon the plurality of data units and the plurality of responses, or a mean round trip time for the plurality of data units and a standard deviation of the mean round trip time.

15. The computer readable storage medium of claim 13, wherein the measuring comprises:
determining a relationship between size of respective said data units and corresponding round trip times.

16. The computer readable storage medium of claim 12, wherein the measuring comprises:
transmitting a data file of predetermined size to the target using a file transfer protocol; and
determining a time required to transmit the file.

* * * * *